US009400801B1

(12) United States Patent
Aplemakh et al.

(10) Patent No.: US 9,400,801 B1
(45) Date of Patent: Jul. 26, 2016

(54) SYSTEM AND METHOD FOR LOCAL FILE MANAGEMENT AND EDITING UTILIZING REMOTE APPLICATIONS

(71) Applicant: Parallels IP Holdings GmbH, Schaffhausen (CH)

(72) Inventors: Alexander Aplemakh, Moscow (RU);
Alexey Petrukhin, Moscow (RU);
Andrey Omelyanchuk, Moscow (RU);
Dmitry Martynov, Moscow (RU);
Nikolay Dobrovolskiy, Moscow (RU);
Stanislav S. Protassov, Moscow (RU);
Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 39 days.

(21) Appl. No.: 13/761,233

(22) Filed: Feb. 7, 2013

(51) Int. Cl.
*G06F 17/30* (2006.01)

(52) U.S. Cl.
CPC .................. *G06F 17/30194* (2013.01)

(58) Field of Classification Search
USPC ........................................ 707/827
See application file for complete search history.

(56) References Cited

U.S. PATENT DOCUMENTS

| | | | | |
|---|---|---|---|---|
| 5,579,239 | A * | 11/1996 | Freeman et al. | 348/14.01 |
| 7,127,477 | B2 * | 10/2006 | Duncombe et al. | 709/238 |
| 2010/0023858 | A1 * | 1/2010 | Ryu et al. | 715/702 |
| 2012/0173612 | A1 * | 7/2012 | Vegesna-Venkata et al. | 709/203 |
| 2013/0111336 | A1 * | 5/2013 | Dorman et al. | 715/255 |
| 2013/0166862 | A1 * | 6/2013 | Huang | 711/162 |
| 2013/0227279 | A1 * | 8/2013 | Quinlan et al. | 713/165 |
| 2013/0311894 | A1 * | 11/2013 | Rexer et al. | 715/741 |

* cited by examiner

*Primary Examiner* — Scott A Waldron
*Assistant Examiner* — Dongming Wang
(74) *Attorney, Agent, or Firm* — Bardmesser Law Group

(57) ABSTRACT

A method for editing a non-native file on a mobile device using a remote application, including establishing a connection between a local-side component and a remote-side component on a remote computer; wherein the local-side component identifies an editor on the remote computer based on parameters of the file; on the remote computer, activating an editor for a file located on the mobile device; upon selection of the editor, using the local-side component to transmit the file to the remote-side component; storing the file in a storage on the remote computer; opening the file using the editor and giving the editor control over the file using a protocol for remote connection; editing the file on the mobile device as if the editor on the remote computer were native; saving the file on the remote storage and transmitting the file to the mobile device; and replacing the file on the mobile device with the transmitted file.

20 Claims, 11 Drawing Sheets

SYSTEM AND METHOD FOR LOCAL FILE MANAGEMENT AND EDITING UTILIZING REMOTE APPLICATIONS

BACKGROUND OF THE INVENTION

1. Field of the Invention

The present invention is directed to file sharing, and more particularly, to file and application sharing between mobile devices and other remote computers.

2. Description of the Related Art

One of the problems in mobile computing is that frequently, users of mobile devices, such as Smartphones and tablets, receive files that the mobile device does not normally have applications for viewing and working with. For example, in early 2013, there are many applications for mobile devices that permit viewing of PDF and MICROSOFT Word *.doc files, but there are no applications readily available to view or manipulate and edit Visio files on mobile devices. Not all devices have an ability to work with *.docx format, for example, and not all video and audio formats are supported by all mobile devices.

The files in question may be received on the mobile device, for example, as an email attachment. Alternatively, the user can connect the mobile device directly to a computer, and copy the file using the desktop computers file system, which views the mobile device as a form of flash memory. Other possibilities where the user of a mobile device can have access to files (but not a straightforward ability to work with them) are various cloud-based file storage systems, such as DropBox or similar.

Most of the modern mobile devices use a variety of "touch screen" features. Mobile phones and tablets (e.g., iOS™, Androids™, Windows RT™ based tablets, etc.) present some challenges with regard to users touching the screen to select and activate a desired function or an application. The main problem is a size of a screen and a number of activation icons per square inch of the screen.

Conventionally, there are a number of schemes known for remote editing and viewing of files. For example, such services as Google Drive, MICROSOFT Office 365 and Apple iWork provide some capability for working with remote files. If a user needs to send, from his computer, a file for editing, and/or to receive it after editing back to his local computer, then he needs to himself explicitly perform the steps for upload and download.

The majority of user interfaces are designed so that the document being edited is opened by the application that is located on the same physical device as the document itself. Associative connections, in other words, the settings that define which particular application should open which particular document type or format, are normally defined at installation of the software, or, in some cases, by the user himself, if he is familiar with the process of modifying operating system settings in this manner.

Additionally, there are various scenarios for opening documents from the web using local applications. In this case, the document is first loaded on to the local computer, and is then opened based on the file extension, which is associated with the particular application, all of which is done as a single sequence of the events.

The reverse scenario, when a local document is opened by an application located in the cloud, is not commonly found today. This is primarily due to the fact that the set of applications on a local computer is almost always more complete than a set of applications adapted to the web. Although there is some experience in this area in the 1996-2000 time frame, during the Network Computer™ (Oracle), era, which did not have a hard disk (a so-called "diskless node"), an executed remote applications. Network Computer™ is a particular example of a thin client, but even in that case, in the absence of a hard disk, it is difficult to say that the local document was being worked on using a remote application. At most, the client machine stores temporary files in a RAM, and these files disappeared after the computer is rebooted.

A frequent scenario for working with a local file, which bears a resemblance to the work of a remote application (but in reality the application itself is actually loaded in to the memory and on to the disk of the local machine transparently to the user. Thus, the remote application becomes a local application, and uses the hardware resources of the local machine. Examples of this include certain web applications for working with graphics, when such an application loads a file from the local disk drive, edits it, and then stores it again on the disk. Flash and HTML5 are primary examples of such applications, where the local applications of any significant complexity are usually avoided, and for which the user needs to install its own environment for execution, such as Adobe Flash Player for Flash, and a browser for HTML5.

Also, the network file system (NFS) technology is also known. Such technology is intended for accessing remote files and managing those files. When using NFS, the client application, which is located on the client computer, works equally transparent with those local files and files located on remote storage. NFS is based on remote procedure call (RPC)—a technology that permits programs to call functions and procedures in a different address space, typically on remote computers.

FIG. 1 illustrates editing and emailing a file according to the conventional approach. As shown in FIG. 1, a user 103 of a mobile device 101 receives, in an email, an attached file 108A, which can be a document that is available for editing and/or viewing. Examples might be graphical or text documents. The user 103 saves the file 108A to his disk 104 (in the case of a mobile device, this is typically either internal flash memory, or a memory card). As further shown in FIG. 1, the saved file 108A has a corresponding object 108B. Then, the user can launch the editor 106 for the document on the remote computer 102. The object 108B is sent to the remote computer 108C, and the editor 106 permits the user 103 to edit the file 108C. Then, once the file is edited, it is saved to the storage 107. As in FIG. 1, the saved file has a corresponding object 108D. Then, the user 103 requests the file to his device, and receives a file 108E. In essence, the file 108D erases the file 108B, to generate the file 108E. Only after this, the user can attach the file 108E as an email attachment 108F to an email of the mail client 105, and to send this to the recipient.

Accordingly, there is a need in the art for a mechanism to permit the user to seamlessly work with files on his mobile device, where the applications for working with the types of files in question are located elsewhere, such as in the cloud or on the user's desktop computer.

SUMMARY OF THE INVENTION

Accordingly, the present invention is directed to a method for remote accessing of applications for editing of local and cloud-based files, that substantially obviates one or more of the problems in the related art.

An exemplary embodiment provides a method for editing a non-native file on a mobile device using a remote application, including establishing a connection between a local-side component and a remote-side component on a remote computer; wherein the local-side component identifies an editor on the remote computer based on parameters of the file; on the remote computer, activating an editor for a file located on the mobile device; upon selection of the editor, using the local-side component to transmit the file to the remote-side component; storing the file in a storage on the remote computer; opening the file using the editor and giving the editor control over the file using a protocol for remote connection; editing the file on the mobile device as if the editor on the remote computer were native to the mobile device; upon completion of the editing, saving the file on the remote storage and transmitting the file to the mobile device; and replacing the file on the mobile device with the file edited on the remote side.

Optionally, the file on the mobile device and the file on the remote computer are continuously synchronized in real time. Optionally, the synchronization is performed in a full replica mode, or in an incremental mode. Optionally, the mobile device has an application for editing the file, but the editor on the remote computer is used if the local-side component determines that the editor on the editor has more functionality than the application.

Optionally, the mobile device has a file browser for locating the file for editing. Optionally, the file is initially located in cloud storage. Optionally, the local-side component transmits a URL of the file instead of the actual file, to the remote-side component. Optionally, the remote-side component transmits at least a fragment of a name space tree to the local-side component, the name space tree containing a hierarchical list of installed applications and file type associations. Optionally, the remote-side component transmits the fragment in a background mode.

Optionally, the remote-side component transmits a video stream representing a window of the editor. Optionally, the local-side component does not display scroll bars from a window of the editor. Optionally, the window of the editor is displayed on the mobile device as occupying the entire screen. Optionally, the local-side component converts touch screen interface commands into editor commands suitable for the remote computer configuration.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 3:
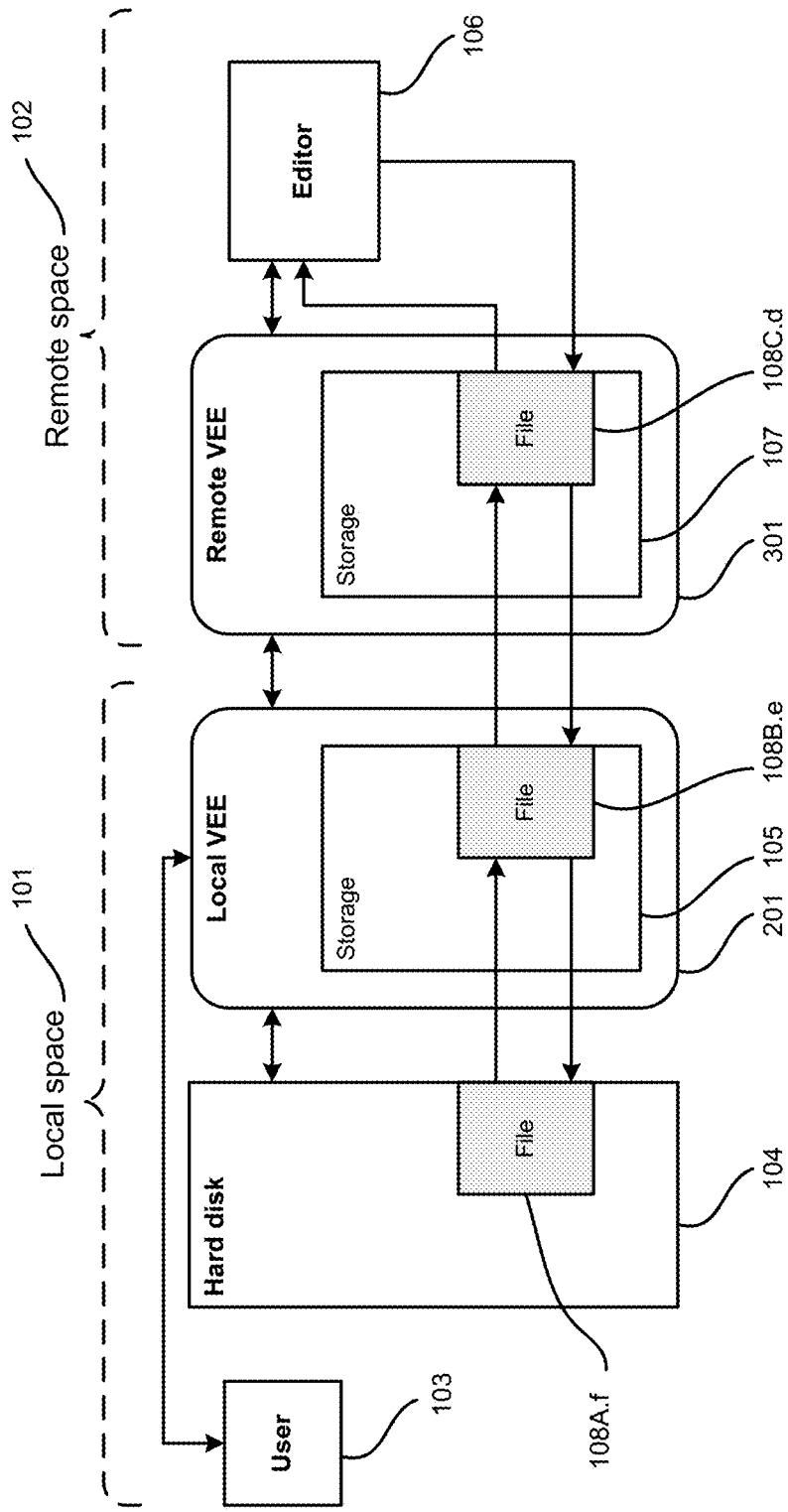
Figure 4:
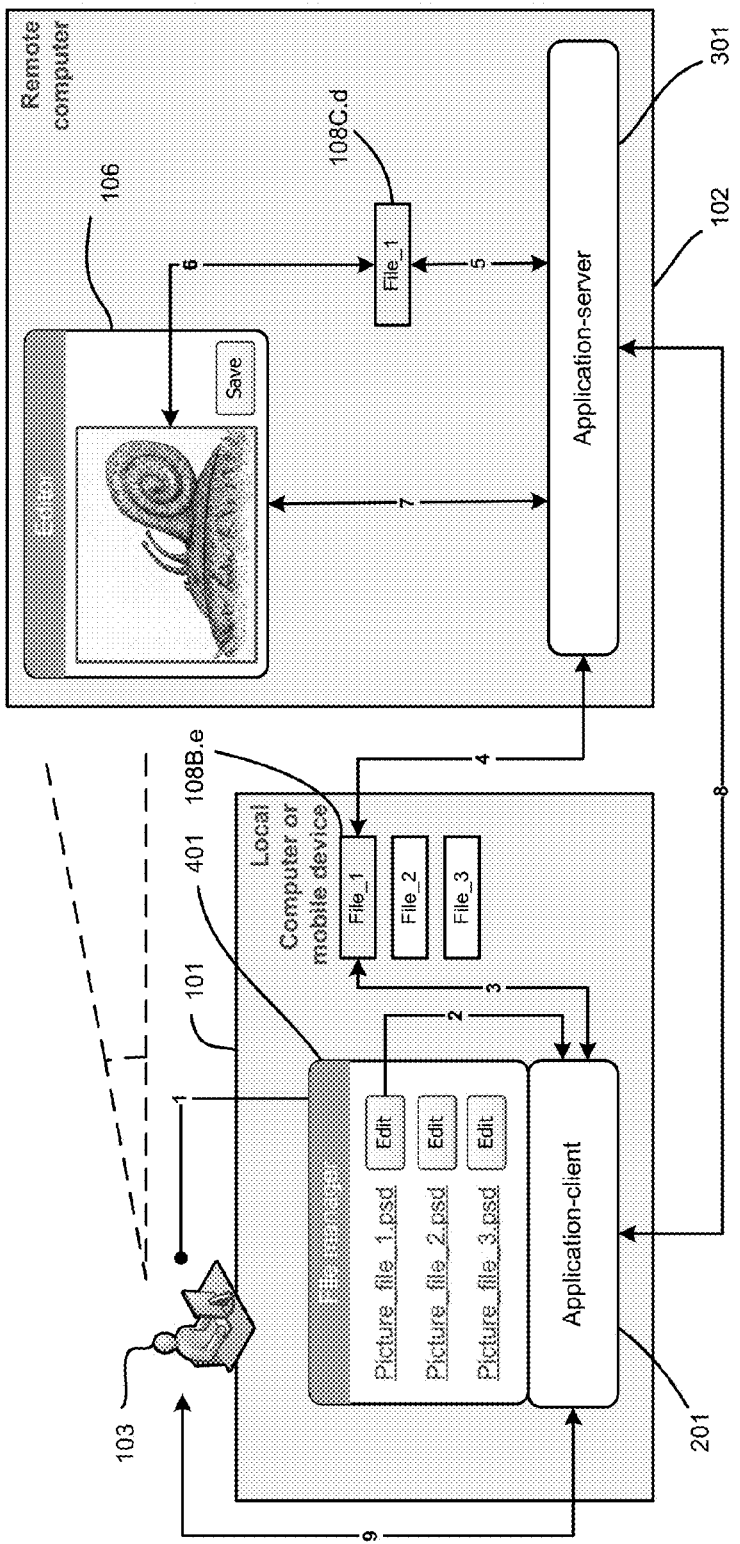
Figure 5:
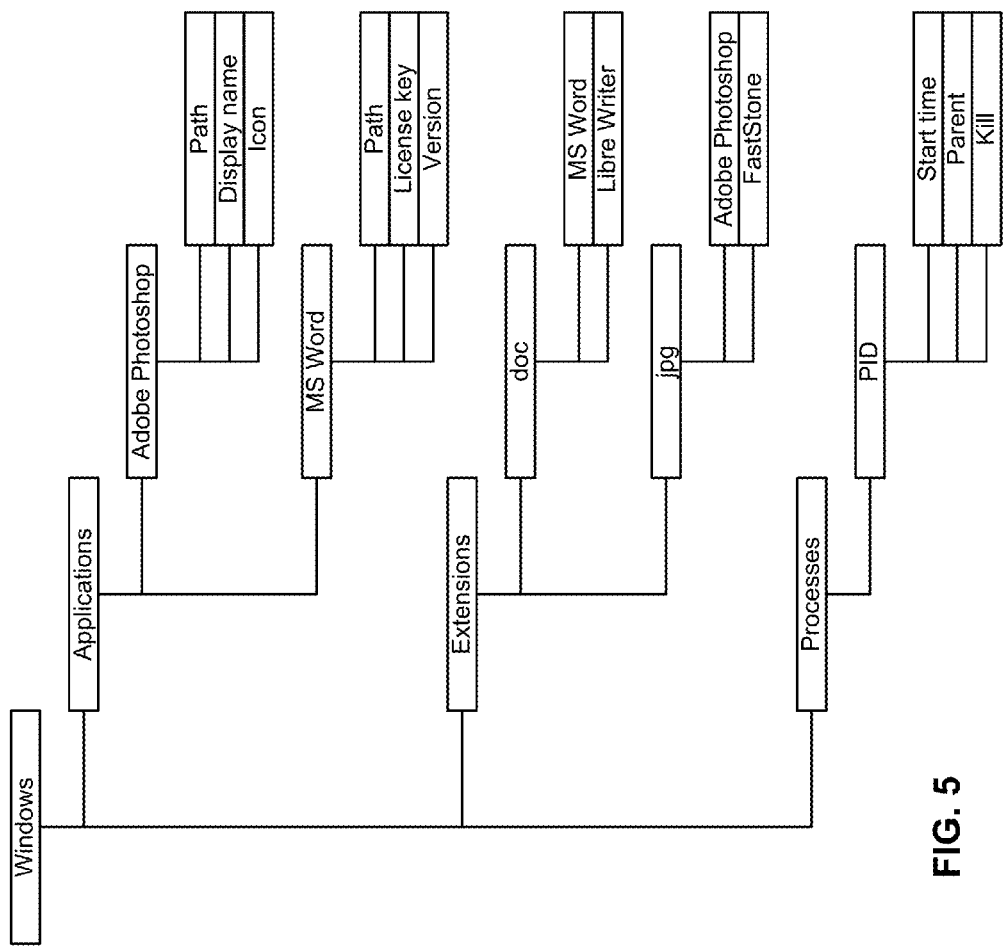
Figure 6:
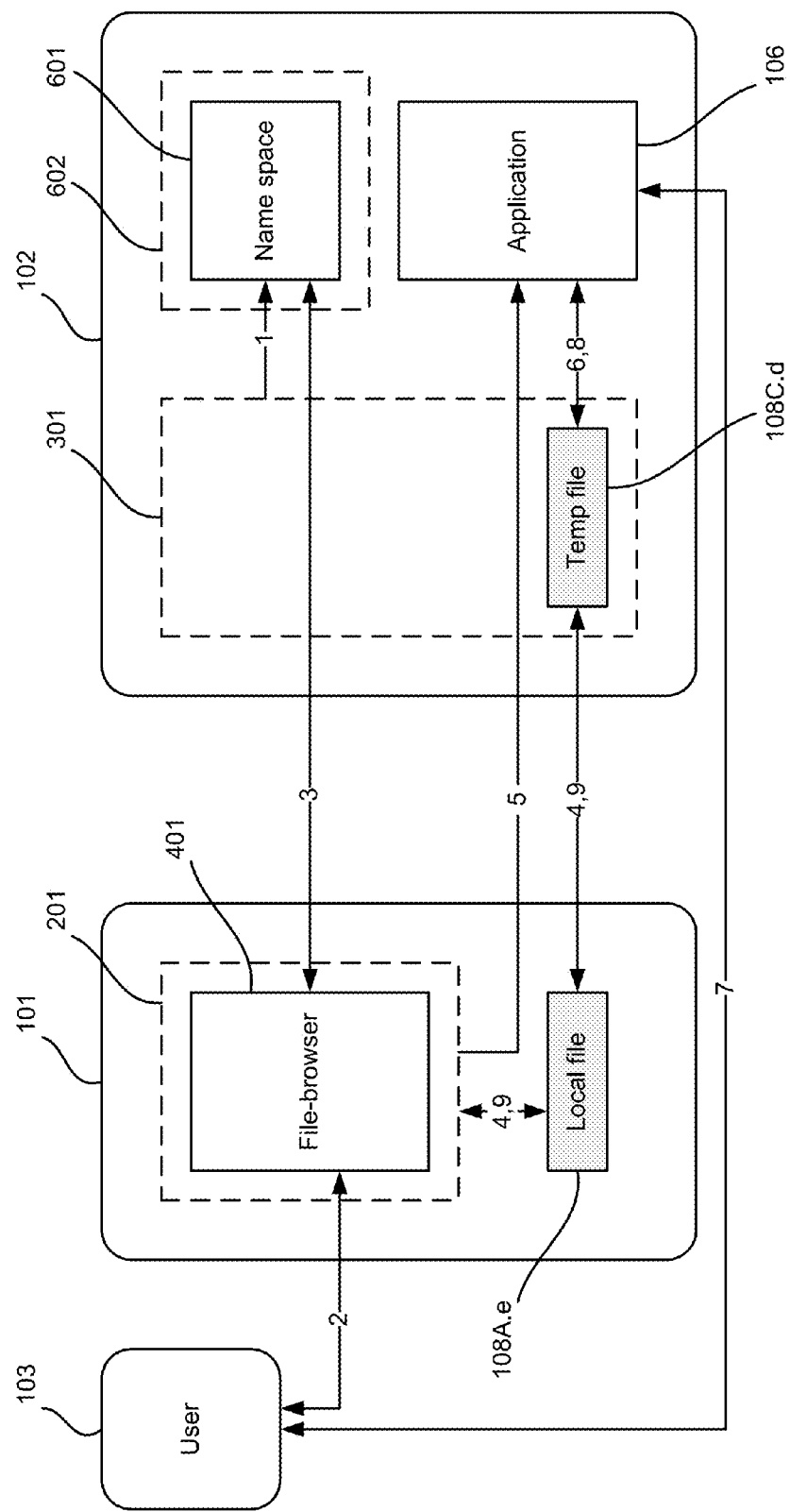
Figure 7:
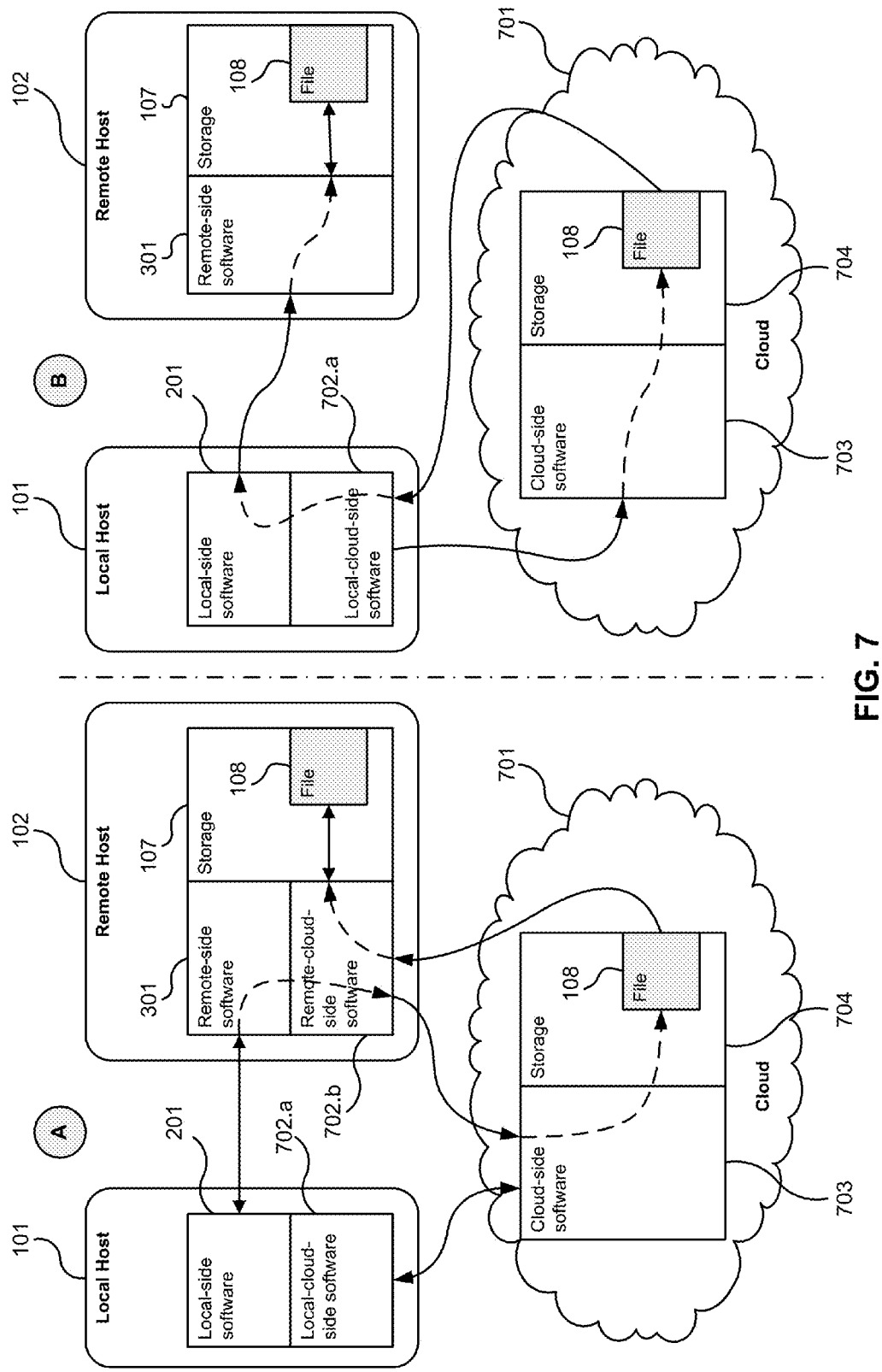
Figure 8:
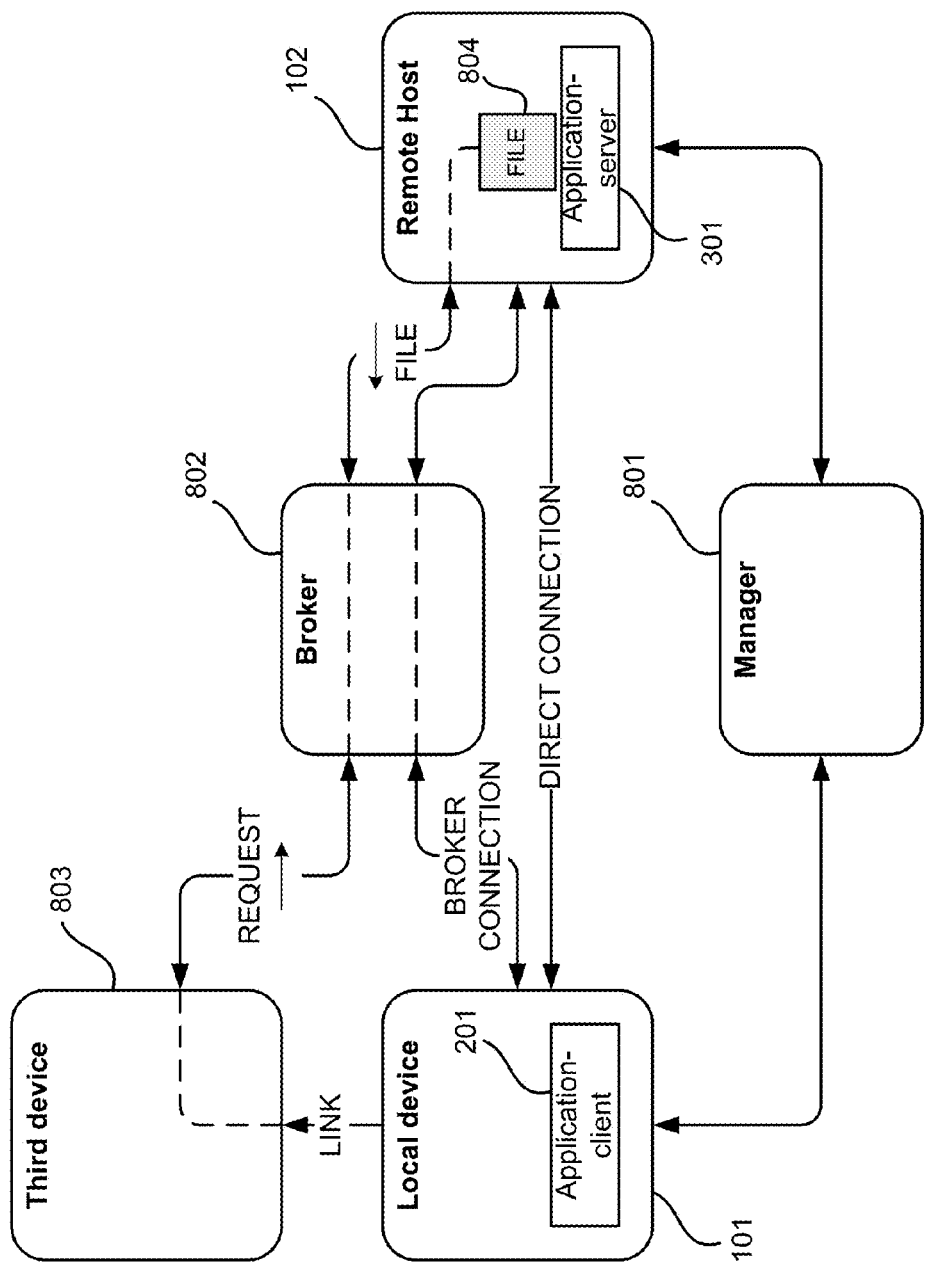
Figure 9:
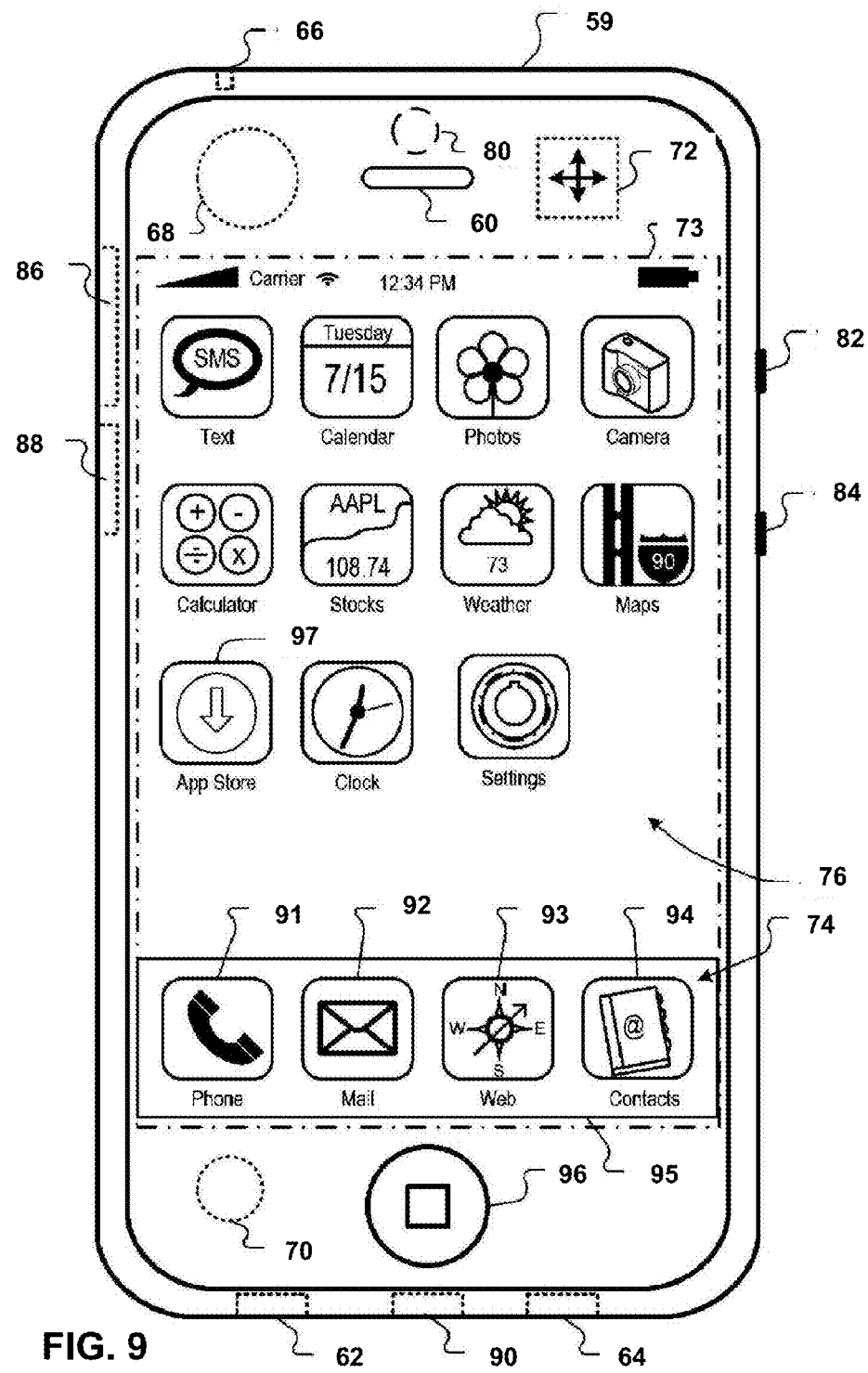
Figure 10:
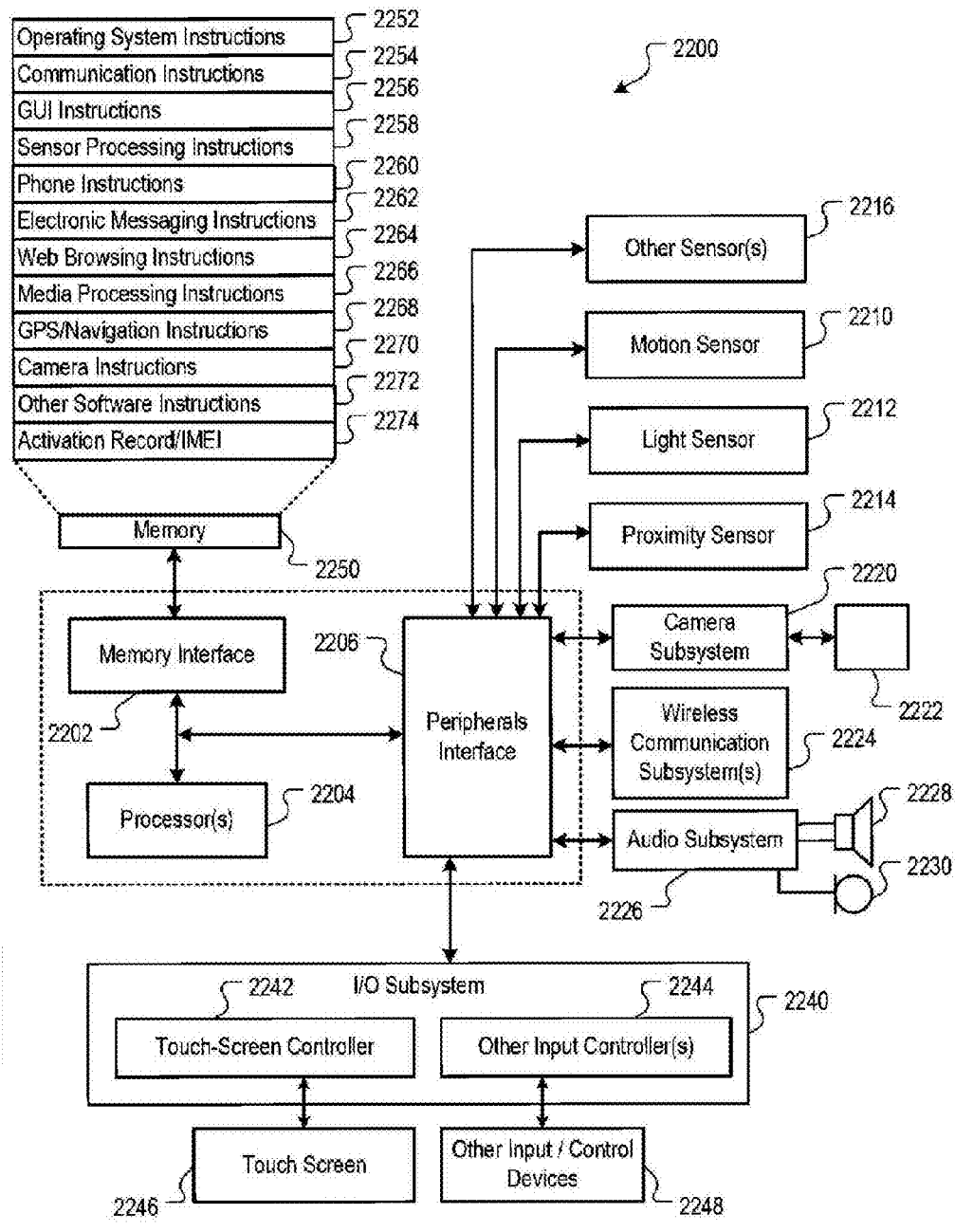
Figure 11:
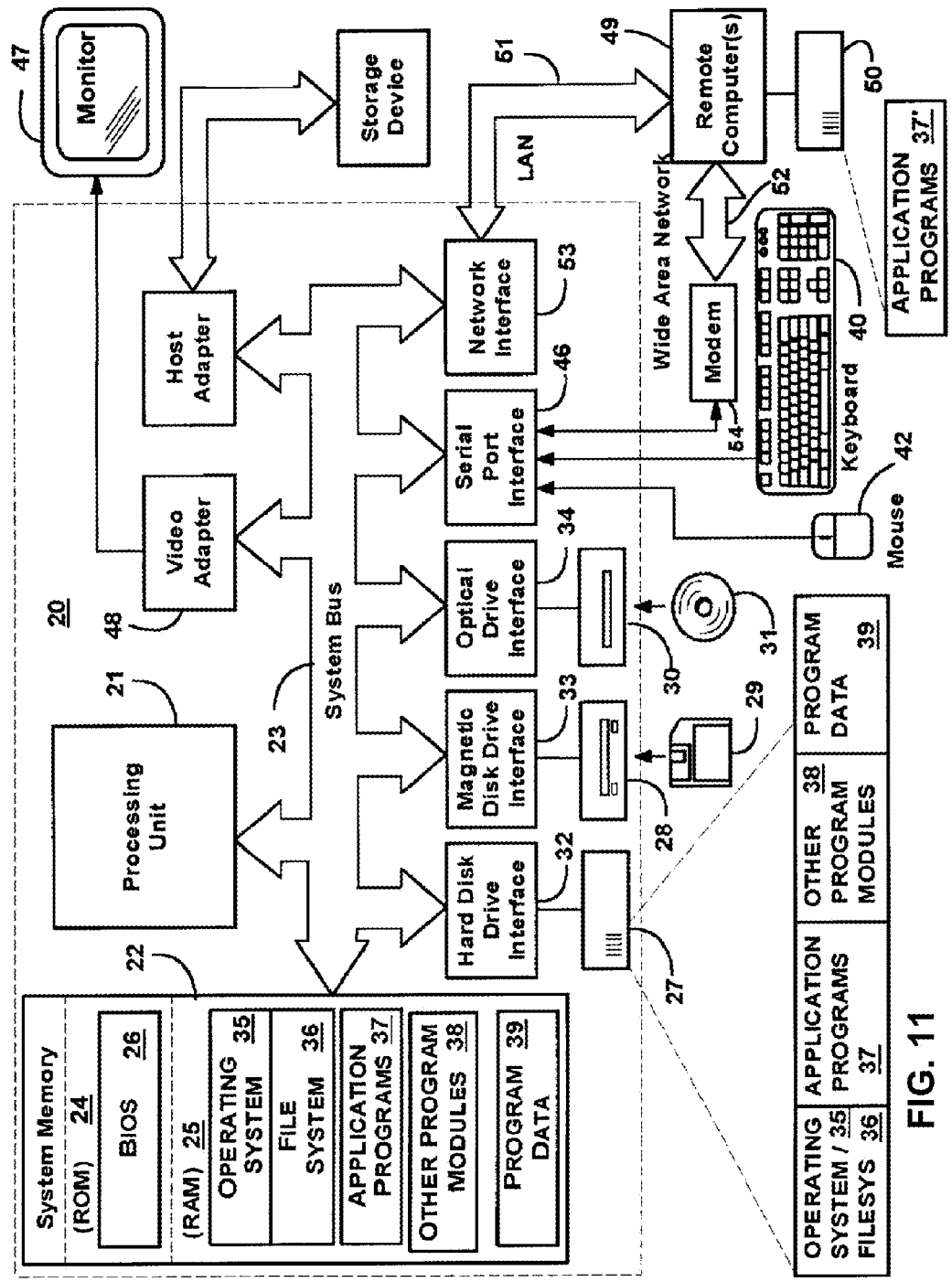

FIG. 3 interaction between objects on a local machine and a remote machine during the editing;

FIG. 4 illustrates interfaces seen by a user when editing the document;

FIG. 5 illustrates a name space tree fragment;

FIG. 6 illustrates the process of editing a document using a remote application;

FIG. 7 illustrates two scenarios of preparing a cloud-based file for editing using a remote application;

FIG. 8 illustrates access to a file on a remote computer from a third party computer;

FIG. 9 is a block diagram of an exemplary mobile device that can be used in the invention;

FIG. 10 is a block diagram of an exemplary implementation of the mobile device;

FIG. 11 illustrates a schematic of an exemplary remote or cloud computer system that can be used for implementation of the invention.

DETAILED DESCRIPTION OF THE PREFERRED EMBODIMENTS

Reference will now be made in detail to the preferred embodiments of the present invention, examples of which are illustrated in the accompanying drawings.

DEFINITIONS

VEE (Virtual Execution Environment)—can be any of a Virtual Private Server (Container), a Virtual Machine, a Hypervisor-based Virtual Machine, and a Lightweight Hypervisor-based Virtual Machine, a session of Terminal Server and a session of Presentation Server, Lightweight Hypervisor-based Virtual Machines, VMM-based VMs or hypervisor-based VMs. In the present case, the VEE can have a remote connection to another VM, to provide for access of the local user to cloud-based applications as if they were native (whether they were native or virtualized).

Parallels Mobile—software that allows a user to remotely access all the applications on his Mac—both Mac applications and Windows programs.

Network Redirector—software components installed on a client computer that is used for accessing files and other resources (printers and plotters, for example) on a remote system. The network redirector sends (or redirects) requests for file operations from local client applications to a remote server where the requests are processed. The network redirector receives responses from the remote server that are then returned to the local application.

NFS (Network File System)—is a distributed file system protocol originally developed by Sun Microsystems in 1984, allowing a user on a client computer to access files over a network in a manner similar to how local storage is accessed. NFS, like many other protocols, builds on the Open Network Computing Remote Procedure Call (ONC RPC) system.

RPC (Remote Procedure Call)—is an inter-process communication that allows a computer program to cause a subroutine or procedure to execute in another address space (commonly on another computer on a shared network) without the programmer explicitly coding the details for this remote interaction. The idea of a calling a remote procedure is in expansion of a well-known and well-understood mechanism of transfer of control within a program, where execution first takes place on one machine, and as the control has been transferred to another machine over a network. The remote procedure call mechanism is intended to make the arrangement easier for distributed computation and for creation of distributed client-server information systems. RPC is most effective in those applications that have interactive connections between remote components with relatively short response times, and relatively small amounts of data being transmitted. Such applications are often referred to as RPC-oriented.

The present invention therefore permits synchronization of files between a mobile device and remote entities, such as applications running on a user's desktop or in a cloud. The synchronization between the file on the mobile device and the remote entities is done automatically, in the background. All a user needs to do is select a file icon, for example, for a MICROSOFT Visio file, and the local (i.e., on the mobile device) Parallels Mobile application will recognize that this is a file for which the mobile device does not have an application, will connect to an entity that it knows does have an application and has a counterpart application running thereon, and will synchronize, in the background, the contents of the file on the mobile device and the contents that the remote entity is actually working with. The user does not need to worry about downloading and uploading different versions of the file, since the file is automatically synchronized. Such synchronization can be done either by sending the entire file, or by only sending portions of the file that were changed by the user (i.e., as a form of delta increments).

One of the advantages of the method and system described herein is that the user no longer needs to concern himself with the upload and download operations, since these operations are done automatically in the background. Also, since the actual application that is working with the file is running on a remote machine that has the full capabilities of both the hardware and the software intended for that application, the user gets the benefit of that full capability, rather than having to settle for a "reduced" version intended for mobile devices.

Also, given that the mobile device often has applications that competes for bandwidth, the user can set preferences as far as which application has a priority in case of limited bandwidth—for example, audio, video, data synchronization, and so on.

Furthermore, the intention is to make the experience of working with the file as seamless and as close to "native" as possible for the user, notwithstanding the fact that the actual application is only running on a remote desktop or in the cloud. Thus, the user has an option to make the window in which he is working with a particular file (for example, a Visio *.vsd file or a *.docx file) occupy the entire screen of his mobile device. Also, the normal graphical elements that are used to work with files on a desktop, such as scroll bars and similar, can be omitted from the screen, since the user interface on a typical mobile device is much more touch oriented. Thus, only the inner area of the window that is displayed when, for example, editing the Visio file, and this area may be displayed as occupying the entire screen of the mobile device (without the scrollbars and other controls on the periphery of the window). Thus, the intent is for the user to have as close to a native experience with the application as possible, even though many mobile devices are not intended for running the applications at issue.

Note also that the approach described herein can work with any file to which the user has access on his mobile device—these may be files received as an email attachment, downloaded from a website, available in file sharing folders, such as DropBox and similar, available on a remote computer as part of a remote computer file system (for example, the user's desktop computer at home may be such a computer, while the user wishes to work with a particular file "on the road", and therefore that file will be downloaded to the user's mobile device, and then synchronized, as described above and below).

The proposed method and system are therefore directed to document management in a remote access regime, with the help of remote access software. Here, file management refers to storing the document as part of a local file system (i.e., on a mobile device, such as a smartphone or a tablet), or storing it on a remote storage, such as network access device, an accessible desktop computer, or cloud storage, loading the files from remote storage to local storage on the mobile device, copying the file from the mobile device to remote storage, editing the file using an application running remotely, viewing file content using applications running remotely, and so on. The approach proposed herein is based on client-server mechanisms, and optimizes such file management, thereby permitting the user to not concern himself with too much unnecessary information and extra operations. The local documents in this case can be located on the user's mobile device, on a computer (local or remote), on the Internet as being accessible through a website, or in a file sharing website, such as DropBox. In some cases, the user can access these files through a browser on his mobile device.

Additionally, the present invention is particularly relevant to users of mobile devices because the software applications that are typically written for mobile devices have only limited functionality, primarily due to the user interface issues and relatively small screen sizes.

The present approach, in contrast to the conventional approach, utilizes the full resources of the remote computer and the resources of the application written for that computer, to take full advantage of the features of the applications in question. Many appropriate environments widely use server-based applications. This "infrastructure" software, is intended for distributed computing systems with specially defined services for business logic. The application servers typically require adherence to various standards when writing application software. The most common such standard is J2EE (JAVA 2 Enterprise Edition). Common solutions for this standard include Sun GlassFish, IBM WebSphere, RedHat JBoss Application Server, and Apple WebObjects. Application-level protocols, that enable communication between the client and the server can be, for example, RDP, ICA, and so on.

The proposed approach for working with a remote application does not require adherence to any particular standard for writing application software also, the servers on which the applications land are frequently large-footprint solutions, particularly given the often relatively modest tasks involved, and rarely are they appropriate for individual users outside corporate environments.

Note also that such protocols as RDP and ICA are platform-dependent, and require an element responding to their request on the local platform, which also conforms to the protocol. The protocol needs to take into account which GUI elements are used in the software application, and transmit information about changes in these elements over the network. On the local-side, the software using the protocol renders an object model of the remote application.

In contrast, the proposed method works using the principles of RFBP (Remote Frame Buffer Protocol) or using a standard video codec. There is no need for the client-side software for any particular knowledge about the nuances of the application itself. An image is transmitted as a set of pixels, or, alternatively the changes of the state of those pixels. In recent times, the general trend in development of remote access is in the direction of greater use of video codecs, since the speed with which processors can work with video data is growing faster than the speed of network connections, and growing faster the bit rate that can be realistically expected during transmission. Therefore, compressing information on the sender's side, and decompressing the information on the receiver side, is increasingly easy and advantageous. Another advantage of transmission of images in the video screen is that such images are platform-independent, and require only the ability to view video or animation.

In general, any network based applications designed for client-server architecture require adherence to specific standard during design and coding phases, and most such server-based applications are intended for use by multiple users, which gain in some efficiency, in the economic sense, due to placing the network application on a powerful server.

However, if a network application is functioning not in a context of server-based infrastructure, then each such application requires its own client part, located on the client computer. In contrast, the proposed method requires only a single client-side module, to access all the remote applications.

RPC has a number of problems, most of which are due to the differences in programming languages and operating environments: data structures and function called structures are often different, some of these, which are supported by one language, are not supported by another, and so on. Thus, the compatibility problem with RPC remains, and has not been solved to date.

The proposed system and method uses a shared approach, where a file or folder is common to multiple computing devices. The sharing approach can apply not only to files but also to printers, which is already commonly used. Users that connect to the same network with a printer can all print their documents on the printer. Similarly, a mouse and a keyboard can also be shared, see the Synergy project (http:**synergy-foss.org/—"Synergy lets you easily share your mouse and keyboard between multiple computers on your desk. Synergy runs as a client/server application, where the server is the computer that will have the keyboard and mouse attached to it, and all others will connect as clients. Switching from one display to another is only a matter of moving the mouse to the edge of the screen, and Synergy will detect the mouse pointer leaving one screen and entering another."). Such a solution can be useful, for example, one presenting on multiple screens, each of which belongs to its own computer. The operator, when moving the mouse, can launch appropriate applications on those computers, to thereby result in a single control center for multiple screens.

With the appearance of mobile devices on the scene, which in some sense are analogous to computers (despite the details of the user interface), and which have their own operating system and equivalent of a hard disk drive for storing applications and data, their users nevertheless often find that the software available on those mobile devices is much more limited, compared to software available for desktop computers. Therefore, the proposed methods and system are intended to address this shortcoming. A great many programs for remote access exist, each of which necessarily has two elements—a local-side element, and a remote-side element. Such solutions as TeamViewer, LogMeIn, Radmin, Windows Remote do not work with remote applications—they work with applications, but only within the framework of a remote operating system. The user works directly with the local-side element on his local device, and views or edits objects on a remote computer, which is possible due to the remote-side element, installed on the remote computer. For example, to edit a local document by using a remote application, the user needs to initiate a relatively involved sequence of operations, and each one needs to be performed individually and usually manually. The proposed approach permits the user to "rise above" such detail, and focus on working with the document itself, rather than the details of how different computers and applications connect to each other.

First Embodiment

The principle of the present invention may be described using the example of software for remote access. Consider a local device (mobile or desktop), which has a local-side software installed on it. A remote device (desktop or cloud server) has a remote-side component installed. A connection is established between the local-side component and a remote-side component, for example, using UDP or TCP protocol. In the standard UDP architecture, video and audio streams are transmitted via UDP, while TCP is used to transmit the input/output controls, files and commands. A local-side component often includes a file browser, which the user can use to view the list of files and folders of both remote and local devices, and transmits the lists (and possibly metadata) in both directions. According to one embodiment of the present invention, the user can see a list of applications that the user can open from his file browser, where the list of applications lists those that might be associated with the file or file type or extension, and which permits file viewing and/or editing, as appropriate. The list can also be divided into two sub-lists, locally available applications, and remote applications. If the user selects one of the remote applications, then the local file will be opened using that remote application and the user will be able to work with the file as if the remote application is running on his local mobile device.

The remote-side component, once launched on the remote computer, requests, from the operating system, information about installed applications. This data is transformed into a tree-like name space structure, which is analogous, for example, to the MICROSOFT Windows registry. An example of a fragment of such a tree is shown in FIG. 5. This data can be found in the random access memory of the remote computer, and the local-side component has access to it. The name space structure is known in advance, and is defined for the local-side component by the developer. The tree has the extensions portion, where, for each file extension, there is a list of applications that can work with that extension. Thus, the local-side component can learn which applications should be listed as the possible applications for the user to activate, and the file browser.

When the user, and his file browser on the local device, presses on or otherwise select the file or corresponding icon, the local-side component sends a request to the remote-side component, and receives data from the remote-side component about which applications are available to open this file. The remote-side component API has four types of requests for working with the name space, which are sent by the local-side component at the application level protocol:

1. SUBSCRIBE—a request for values and subscription for certain objects from the name space of the remote component. For example the local-side component can subscribe to receiving information about all remote applications, their names and activation icons. This means that if something changes on the remote computer regarding the subscribed information, then the local-side component will be notified about this in real time, and the local-side component will make corresponding adjustments (for example, if an icon appearance changed on the remote computer, it will correspondingly change on the local device as well; if file association settings were changed on the remote computer, then corresponding changes will be reflected on the local-side component).

2. QUERY—this API request is similar to the subscribe request, only without the subscription—in other words, it permits the local-side components to request a value from the name space tree one time.

3. SET—writing in to the name space. For example, the remote device has two application windows open, and the local user can see that on his local screen. Active window 1 partially covers active window 2. When the user clicks on the inactive window 2, at that moment, the SET request is sent, which, finds the necessary application in the name space, and its daughter parameter active is changed to true. The operating system of the remote computer re-renders its screen, so that window 2 now partially covers window 1. The re-rendered image is then sent to the local device.

4. RPC—remote procedure call, which initiates more complex actions than the SET request. Note that the SET request is one particular example of RPC. As examples for which the RPC request can be used, killing a process on a remote device (as far as the user is concerned, he is shutting down an application), emulating pressing of the shift key.

If a user marked a file on the remote computer as "favorite" through his file browser, then that file is copied to the local device, and these files will be synchronized in real time, and by default, during any remote session. Synchronization, depending on a particular implementation, can be either a full file replica (in other words, the updated file is copied to the other device in its entirety), or rsync, where, when a file is changed, only those portions of the file that is changed are transmitted, which reduces traffic and increases synchronization speed.

When the local file is opened by a remote application, the file is copied to the remote computer into a temporary folder, and is marked as a favorite for one session. The remote application, during its operation, saves the changes into the temporary file on its hard node (which the local-side component does not need to know about). But since the file is marked to save it, it will always be synchronized with the local file that the user knows about. When the connection session ends, the temporary file on the remote computer is deleted, but remains on the local device. Depending on file browser settings, the file browser can offer the user the following options for opening a file:

by a default application on a local device;
by a default application on a remote device;
by one of associated applications on a local device;
by one of associated applications on a remote device.

The default status for an application means that if a user is not offered a list of possible applications for opening this file with a particular file type, then, upon command to open the file, the default application will be used to open it. Thus, the proposed concept for working with remote applications in remote access software class permits expanding the boundaries of the remote operating system, and integrating the operation of remote applications with a local file structure. Note that as far as the user is concerned, he is working on his own computer or mobile device and to him, the interface appears native, which is convenient from a usability perspective.

For a user, there are two primary scenarios for opening the file in an application:

1. Find a file in the file manager, and using double click or by selecting an application from the list of associated applications, opening it;

2. Open the application and then launch the file browser, within it, and selecting the file for opening.

Option 1 is described above. Option 2 is also possible, if first the remote application is launched from the local machine, then the local-side component can offer its own file browser, with its own ability to select both remote and local files.

This is also possible to do using a driver that is specially written for remote access, such as network redirector drivers.

Second Embodiment

Figure 1:
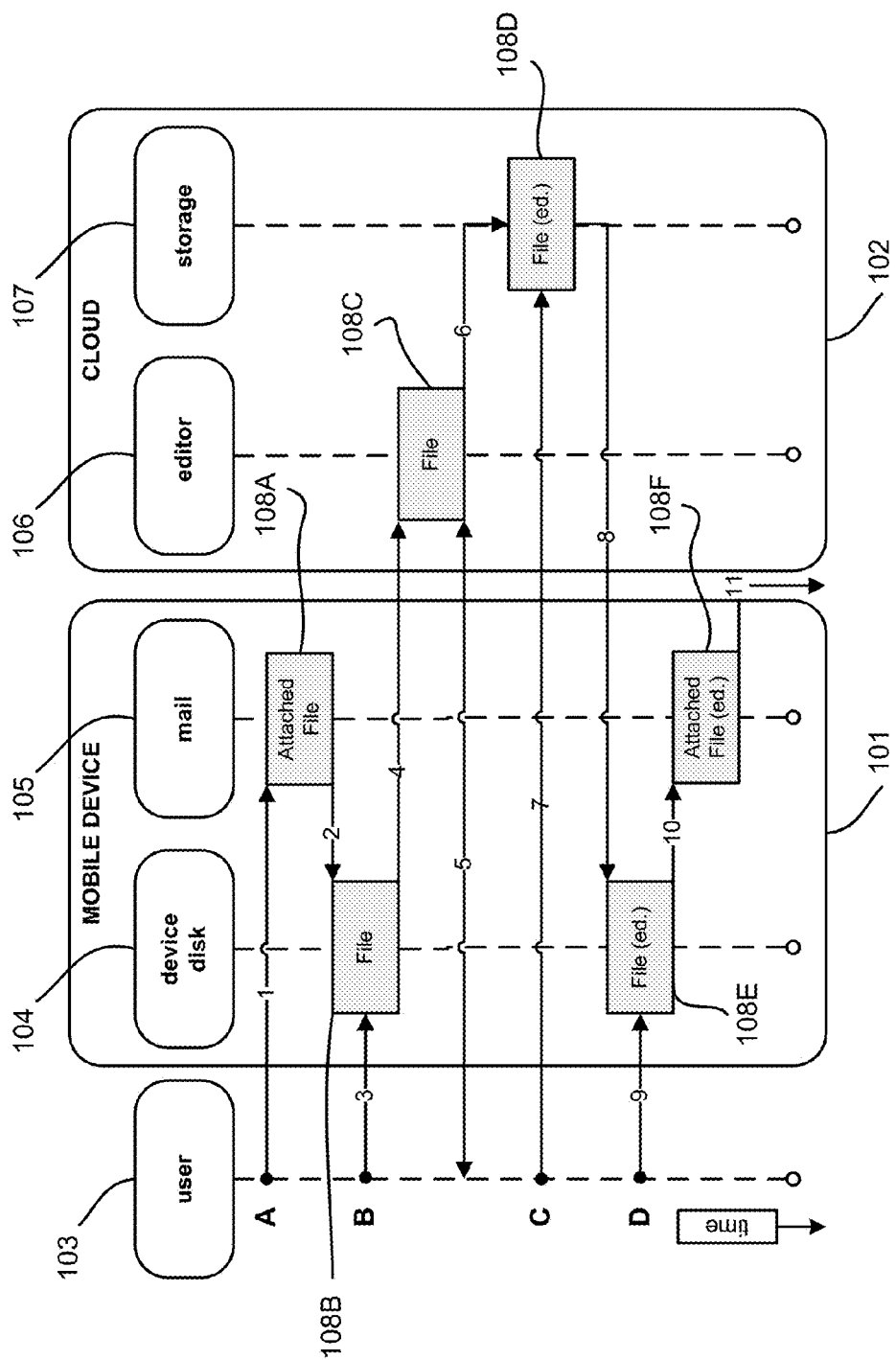
FIG. 1 illustrates a conventional method of editing and sending a file from a mobile device.
Figure 2:
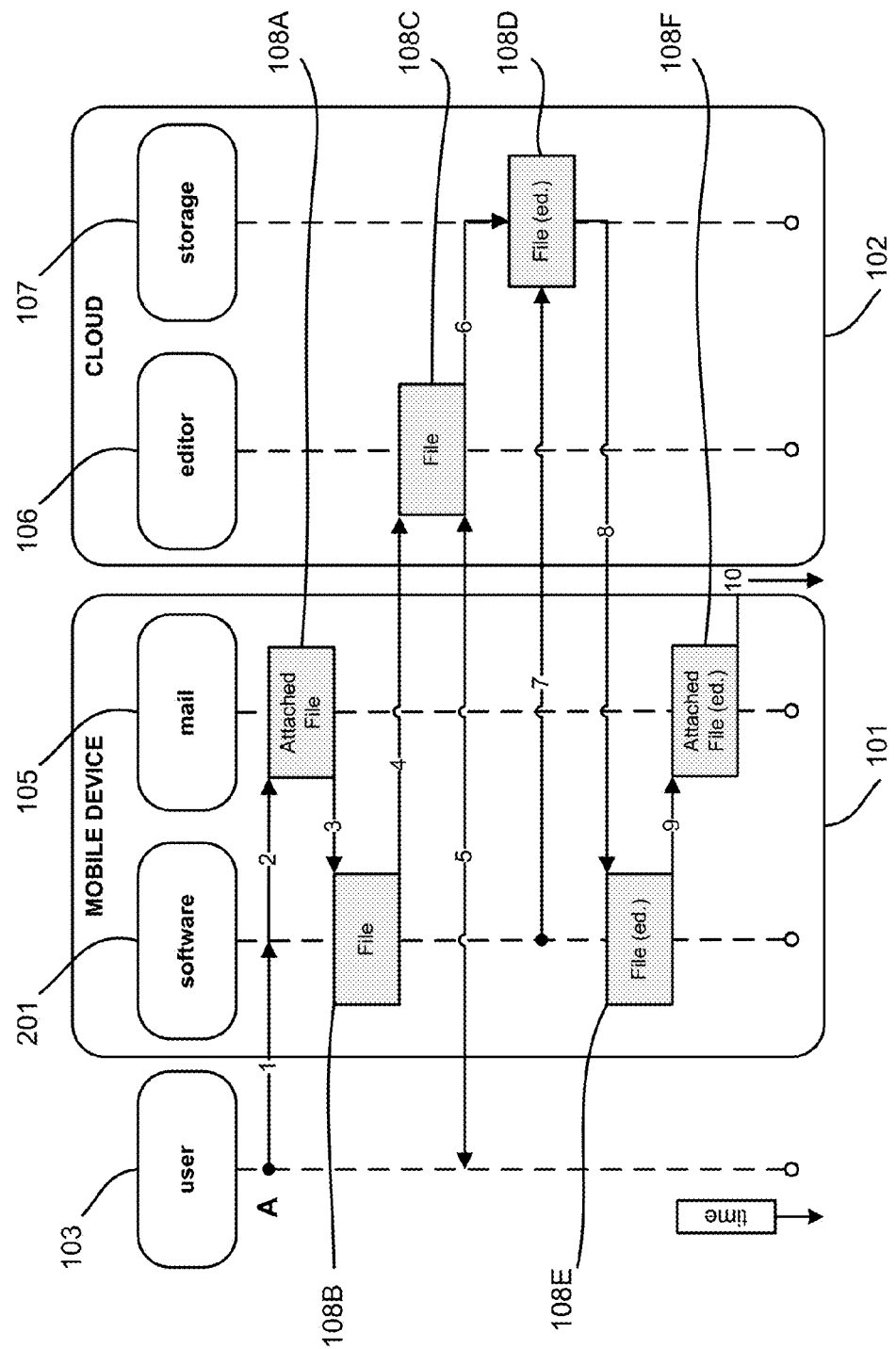
FIG. 2 illustrates one embodiment of method of editing and sending a file according to the present invention.

As another example that illustrates the advantages of the present invention, the following situation can be considered:

A mobile device user receives an email with an attached file, which he needs to edit, and then send the file over email. FIG. 1 and FIG. 2 illustrate how, in a conventional scenario, the user needs to take four different steps to give commands to different programs that apply to the file. In the present case, only a single step is necessary. Consider an example where the mobile device has virtualization software installed on it, such as Parallels Mobile. The user of the mobile device receives the email with the attachment, and wishes to edit the file prior to forwarding it over email again. The email client, launched inside Parallels Mobile, can take advantage of the "edit" but within the Parallels Mobile interface.

Upon pressing the edit button, Parallels Mobile saves the attachment in its own file structure on the local disk, and identifies which application can be used to open the file for editing, on a remote or cloud computing system. Here, the cloud can be either a server farm, or a remote Mac computer with Parallels Desktop installed on it, thanks to which Parallels Mobile receives access to all the applications on the Mac and all the applications running under a guest OS in a Virtual Machine on the Mac. For example, if the attached file has the MICROSOFT Word format (*.doc or *.docx), then Parallels Mobile will look for the text editor MICROSOFT Word (either in the guest OS or in the host OS, either on the remote desktop, or in the cloud). If Parallels Mobile successfully finds MICROSOFT Word, then it sends the file to the cloud or remote desktop for editing. The cloud software saves it to a disk in its own storage, and the user sees the remote MS Word and can work with it as if it were a local application. Once the editing is done, the user can press on the button "save and send".

The edited file is then saved on the remote computer, and is sent back to the Parallels Mobile's storage on the local disk drive or similar storage. Then, Parallels Mobile sends a task to the email client to create a new email, and attaches the edited file to the letter. All the user needs to do is fill out the parameters of the email and send it.

Third Embodiment

The proposed invention also permits to expand the range of applications that are accessible to the mobile device through virtualization and Virtual Machines. If the remote computer has a Virtual Machine running the applications running inside that Virtual Machine can be used for editing or viewing local files on the mobile device. For example:

1. An email client can be launched within a virtual execution environment on the user's device;

2. The user, with one button, begins the task of editing the attached file and attaching it to a new letter;

3. The VEE (virtual execution environment) saves the attachment as a file on a disk in its own disk or flash storage in its own storage;

4. The VEE analyzes the file format and the presence of an appropriate application on the remote host or cloud, for editing the file;

5. After finding the appropriate application on the remote computer or cloud, with which the VEE has a connection session, the file is sent to the editor application;

6. The user works with the remote editor, editing the contents of the file;

7. The edited file is saved in the cloud storage;

8. The VEE then requests the edited file back to its own storage;

9. Once the file is received, the VEE attaches it to a new email, using the email client;

10. The user adds the email parameters, such as to and cc, and sends the email.

The attached files can be text documents, graphical files, audio files, video files, and so on. The primary requirement here is that the remote computer has an application that understands and can work with the format of the attached file. Also, the remote computer needs to have an execution environment for receiving and processing requests from the local-side component on the mobile device.

As a further option, the analysis of the file format on the local-side, an identification of the appropriate remote-side application for working with that file, can be done automatically, when the user opens the email, and as a background process. If the analysis is successful, and the appropriate application is found, then the "edit attached file" button can be changed to "open file in application name".

Fourth Embodiment

Another example of where the present invention is applicable is where the editing process for a file involves three different computing systems—the local/mobile device, the remote desktop, and the cloud here, the cloud can be exemplified by file storage and file sharing services, such as DropBox, Google Drive, Cubby, MS Sky Drive, and other similar services.

Here, the scenario includes the local host that can edit the file that is located on the cloud, using an application that works on the remote desktop. FIG. 7 illustrates two such scenarios, as discussed below.

Fifth Embodiment

A scenario with a shared link involves the user of the mobile device that sends a link to a file that is located on the remote computer, to another user. The other user is using yet another device. The link is a URL, with certain parameters that include the path where the file is found. Upon following the URL, the other user can then receive the file, as described and illustrated in FIG. 8.

FIG. 2 illustrates the process of editing and sending a file, according to one embodiment of the invention. A user 103 of a mobile device 101 receives an email with an attached document 108A, which is intended for editing and/or viewing. The user 103, using an interface 201 that implements the proposed method, issues a command to edit and send the file. The software component 201 then automatically performs the following functions: saves the file 108A as the object/file 108B into its own storage, looks for an appropriate editor 106 on the remote computer 102, and sends the file to the remote computer. The user 103 sees a window displayed by the software 201, which shows an interface of the editor 106, and is able to edit the document 108C. Once the document is edited, it is saved into the storage 107. The figure shows the object 108D, which is transmitted to device 101 and overwrites the file 108B (THE new file is an object 108E). After that, the user uses the software 201 to request the file to his own device, and receives the file 108E. The file 108E is then attached to an email as an attachment 108F, with no further actions required by the user, except to enter the address or name of the recipient, and press the send button.

Thus, as may be seen in comparison with the conventional process shown in FIG. 1, there is a significant reduction in the number of actions that the user 103 needs to take. In the conventional case, there are four separate steps a, b, c, d, while in the present invention only a single step a needs to be taken.

FIG. 3 illustrates the interactions between objects of local and remote computers while the local document is being edited using a remote application. As will be appreciated, the application of the present invention is not limited to mobile devices. The local device can be a desktop computer 101, with a limited set of applications. Its disk 104 has a document 108A.f, which cannot be edited using any of the local applications. The user 103 therefore needs to utilize the services of the remote computer 102, through intermediation of the system for remote access, which has a local-side component 201 and a remote-side component 301. As one option, these can be virtual environments, such as a local VEE and a remote VEE. A connection is established between the local-side component 201 and the remote-side component 301. Upon command from the user 103, the local VEE 201 captures the file into its storage 105 (which can be a hard disk, or an area in RAM allocated to that VEE), and send it to the storage 107 of the remote VEE 301. Then, the remote VEE 301 finds an appropriate application on the remote computer (106) to edit the file 108C.d. The user 103 sees a window displayed by the software 201, and an editor interface 106, and can therefore edit the document 108C.d. Once the document 108C.d is edited, it is returned to the local computer, and the file 108A.f is the updated file.

FIG. 4 illustrates an example of an interface seen by a user, according to one embodiment of the invention. On a local device 101, the user launches the client application 201 that opens a window inside which the user sees the file manager 401. The user 103 finds the document, and presses the edit button. The application client 201 takes the file 108B.e from the disk of the local device, and sent it to the remote computer 102. The remote computer 102 needs to have the server side software running—in other words, the application server 301, which intercepts the file, and stores it into its storage as the file 108C.d, launches the editor 106 for working with the file format at issue. At this time, the user 103 sees the editor 106 interface in the window shown by the application client 201 (the video stream is sent through elements 301 and 201), and can edit the file 108C.d using the editor 106. Note that the signal exchange is bidirectional. The edits performed by the user 103 are saved in the file 108C.d, upon the user selecting the save button in the interface of the editor 106. Saving the file initiates the process of transmitting the file back to the local computer 101, and, therefore, the edited file 108C.d from the remote computer overwrites the local file 108B.e.

FIG. 5 illustrates a fragment of the name space tree. As shown in FIG. 5, the system maintains the applications and their file associations in the form of a tree structure. This is something that the user normally does not deal with directly, but is constructed by the remote-side component, and transmitted to the local-side component upon request.

FIG. 6 illustrates the process of editing a local file using a remote application. To enable the process, the local device 101 needs to have the local-side components 201 launched, and the remote device 102 needs to have the remote-side component 301 launched. When component 301 is launched, it loads the structured name space tree into the memory 602 of the remote device 102. The name space tree contains names of the objects 601 that are accessible to the remote-side component 301. The user 103 launches the file browser 401 in the interface of the local-side component 201. The file browser 401 is a module with a basic interface for a file manager with the additional property that it can also access the name space 601 of the remote computer 102. Once activated, the file manager 401 then enables the editing of the local file 108A.e with the remote application. Then, the file manager 401 requests and receives information about available applications of the remote computer 102, which can work with a format of the file 108A.e. The local-side component 201 then sends the local file to the remote storage, and saves it as a temporary file 108C.d, marking it as a favorite, which activates the synchronization process between the files 108C.d and 108A.e. Then, the local-side component 201, through the intermediation by the remote-side component 301, launches the remote application 106, and opens in it the file 108C.d. The user 103 can then edit the file. The user 103 works with the interface of the editor 106 as if the editor 106 is located on his local machine, and the interface is native. The interaction with the editor 106 is performed through the remote-side component 301 and the local-side component 201. The local-side component 201 sends requests to the remote-side component 301 on the protocol level of the applications, and receives back a video stream to render the images on its screen. When the editing is completed, the user saves the updated file 108C.d, and, due to the subscription to the synchronization, the file 108A.e overwrites the previous version on the local device 101.

FIG. 7 illustrates two scenarios of file preparation for editing with a cloud based application. Scenario A: Remote host 102 has remote-cloud-side software 702B. The local device 101 and the remote device 102 are connected using remote access software and the local-side component 201 and the remote-side component 301. Cloud-side software 702A and 702B are installed on the local device 101 and remote device 102 respectively, in order to authenticate itself to the cloud 701, and to exchange data with the cloud storage 704. In this case, the user 103 can see, using the local-side component 201 can see which file 108, in the cloud storage 704, needs to be edited. Using the local-side component 201, the remote-side component 301, and the cloud based software component 702B, installed on the remote device 102, and the cloud site component 703, installed in the cloud, the user 103 of the local device 101 can copy the file 108 from the cloud storage 704 to the remote storage 107. Then, he can edit the file 108 using the approach illustrated in FIG. 6.

Scenario B: Remote host 102 has no remote-cloud-side software. As shown on the right hand portion of FIG. 7, the local device 101 and the remote device 102 are connected using remote access software and the components 201 and 301. Remote device 102 does not need to have cloud software installed on it, and only be local device 101 can interact with the cloud 701. Then, the user 103 can use the local cloud side software 702A and the cloud side component 703 to request the file 108 to his device, and then transmit it to the remote storage 107. Then, he can edit the file 108, using the approach illustrated in FIG. 6.

FIG. 8 illustrates access to a file of a remote computer from a third party device. As shown in FIG. 8, the connection between the local device 101 and the remote device 102 can take place using a number of different options, depending on network capability. In this example, intermediation by a manager server 801 is needed, which belongs to the vendor of software for remote access (in this example). The local device 101 the request from the manager 801 a list of remote computers that have the application server 301 installed thereon, with the same settings as the settings of the application-client 201. The manager 801 checks in its database whether the user 103 is registered, and then provides him with a list of accessible remote devices. The user 103 on the local device 101 selects which computer he wants to connect to (in this example, to device 102), and the manager 801 sends to the host/device 102 the data needed for the connection. If the network permits it, a direct connection between devices 101 and 102 may be established. If the network does not permit it, the manager 801 sends to the host 102 the address of the broker 802 (i.e., a proxy server), which will service the connection. The host 102 establishes the connection for the broker 802 using, for example, the socks5 protocol, and from there, to the local device 101.

Then, the user 103 of the local device 101 can share a file 804 located on the host 102 and give access to it to another user who owns the device 803. He can form a URL with parameters of the connection, and sends it to the device 803 using a number of mechanisms, for example, through email, SMS, and so on. The user 103 can click on the URL, and through the broker 802 will have access to the file 804. The user 103 can download it to his computer, even after the user 103 of the computer 101 turns off his machine, because the connection between 803 and 102 will still be established.

FIG. 9 is a block diagram of an exemplary device 101, which can be a mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, functionality of each corresponding device may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

FIG. 10 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

With reference to FIG. 11, an exemplary remote computer system (such as a desktop or a cloud server) for implementing the invention includes a general purpose computing device in the form of a computer 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for editing a non-native file on a mobile device using a remote editor application, the method comprising:
   a. establishing a connection between a local-side component and a remote-side component on a remote computer;
   b. wherein the remote-side component identifies the editor application on the remote computer suitable for working with the non-native file that is stored on the mobile device and based on parameters of the non-native file, wherein the non-native file is in a format that is unsupported for editing by an operating system of the mobile device;
   c. on the remote computer, activating the editor for a file located on the mobile device;
   d. upon selection of the editor by the local-side component, using the local-side component to transmit the file to the remote-side component;
   e. storing the file in a storage on the remote computer;
   f. opening the file using the editor application that is executing on the remote computer and giving the editor application control over the file using a protocol for remote connection;
   g. displaying the file on the mobile device and editing the file on the mobile device as if the editor application on the remote computer were native to the mobile device with a native look-and-feel graphical interface of the mobile device;
   h. transmitting the file to the mobile device; and
   i. replacing the file on the mobile device with the transmitted file.

2. The method of claim 1, wherein the file on the mobile device and the file on the remote computer are continuously synchronized in real time.

3. The method of claim 1, wherein the synchronization is performed in a full replica mode.

4. The method of claim 1, wherein the synchronization is performed in an incremental mode.

5. The method of claim 1, wherein the mobile device has a local application for editing the file, but the editor application on the remote computer is used if the local-side component determines that the editor application on the remote computer has more functionality than the local application.

6. The method of claim 1, wherein the mobile device has a file browser for locating the file for editing.

7. The method of claim 6, wherein the file is initially located in cloud storage.

8. The method of claim 7, wherein the local-side component transmits a URL of the file instead of the actual file, to the remote-side component.

9. The method of claim 1, wherein the remote-side component transmits at least a fragment of a name space tree to the local-side component, the fragment of the name space tree containing a hierarchical list of installed applications and file type associations.

10. The method of claim 9, wherein the remote-side component transmits the fragment in a background mode.

11. The method of claim 1, wherein the remote-side component transmits a video stream representing a window of the editor application.

12. The method of claim 1, wherein the local-side component does not display scroll bars from a window of the editor application.

13. The method of claim 12, wherein the window of the editor application is displayed on the mobile device as occupying the entire screen.

14. The method of claim 1, wherein the local-side component converts touch screen interface commands into editor application commands suitable for the remote computer configuration.

15. A non-transitory computer useable medium storing computer code for implementing the steps of claim 1.

16. A system for editing a non-native file on a mobile device using a remote editor application, the system comprising:
- a. a local-side component running on a processor of the mobile device;
- b. a remote-side component running on a remote computer and in communication with the local side component;
- c. the editor application running on the remote computer and associated with a file type of the non-native file stored on the mobile device, wherein the non-native file is in a format that is unsupported for editing by an operating system of the mobile device;
- d. upon selection of the editor application by the local-side component, means for using the local-side component to transmit the file to the remote-side component;
- e. a copy of the file stored on the remote computer;
- f. the file being open for editing using the editor application that is executing on the remote computer, with the editor application having control over the file using a protocol for remote connection;
- g. wherein displaying of the file on the mobile device and the editing of the file on the mobile device appears native to the user of the mobile device with a native look-and-feel graphical interface of the mobile device;
- h. upon completion of the editing, the file being saved on the remote storage and transmitted to the mobile device; and
- i. the transmitted file saved on the mobile device to replace a prior version of the file.

17. The system of claim 16, wherein the file on the mobile device and the file on the remote computer are continuously synchronized in real time.

18. The system of claim 16, further comprising a file browser for locating the file for editing.

19. The system of claim 16, further comprising a name space tree maintained by the remote-side component and transmitted to the local-side component, the name space tree containing a hierarchical list of installed applications and file type associations.

20. The system of claim 16, wherein the remote-side component transmits a video stream representing a window of the editor application.

* * * * *